United States Patent [19]

Chen et al.

[11] 4,428,021

[45] Jan. 24, 1984

[54] CURRENT MONITORING APPARATUS

[75] Inventors: Wen T. Chen, West Newton; Vincent C. Oxley, Waltham, both of Mass.

[73] Assignee: GTE Laboratories Incorporated, Waltham, Mass.

[21] Appl. No.: 405,818

[22] Filed: Aug. 6, 1982

[51] Int. Cl.³ .......................... H02H 9/02; H02H 3/00
[52] U.S. Cl. ......................................... 361/94; 361/42; 361/47
[58] Field of Search ...................... 361/42, 47, 48, 49, 361/50, 93, 94; 340/650, 664

[56] References Cited

U.S. PATENT DOCUMENTS 4,101,826  7/1978  Horsitmann ..................... 340/664

Primary Examiner—Harry E. Moose, Jr.
Assistant Examiner—Patrick W. Foster
Attorney, Agent, or Firm—David M. Keay

[57] ABSTRACT

Apparatus for monitoring the fault current in the ground conductor of a polyphase AC electrical power system. When the fault current exceeds a predetermined level, the magnetic field produced causes a magnetic reed switch to close and open at twice the AC frequency. Pulse producing circuitry connected to the reed switch responds to the switch action to produce pulses at the same frequency. The pulses are counted by logic circuitry, and when a predetermined number of pulses have been counted, an output signal triggers circuitry which trips circuit breaker apparatus in the power system. The delay period between first detecting the fault current and tripping of the circuit breaker apparatus can be adjusted by changing the number of pulses to be counted by the logic circuitry before it produces an output signal.

18 Claims, 1 Drawing Figure

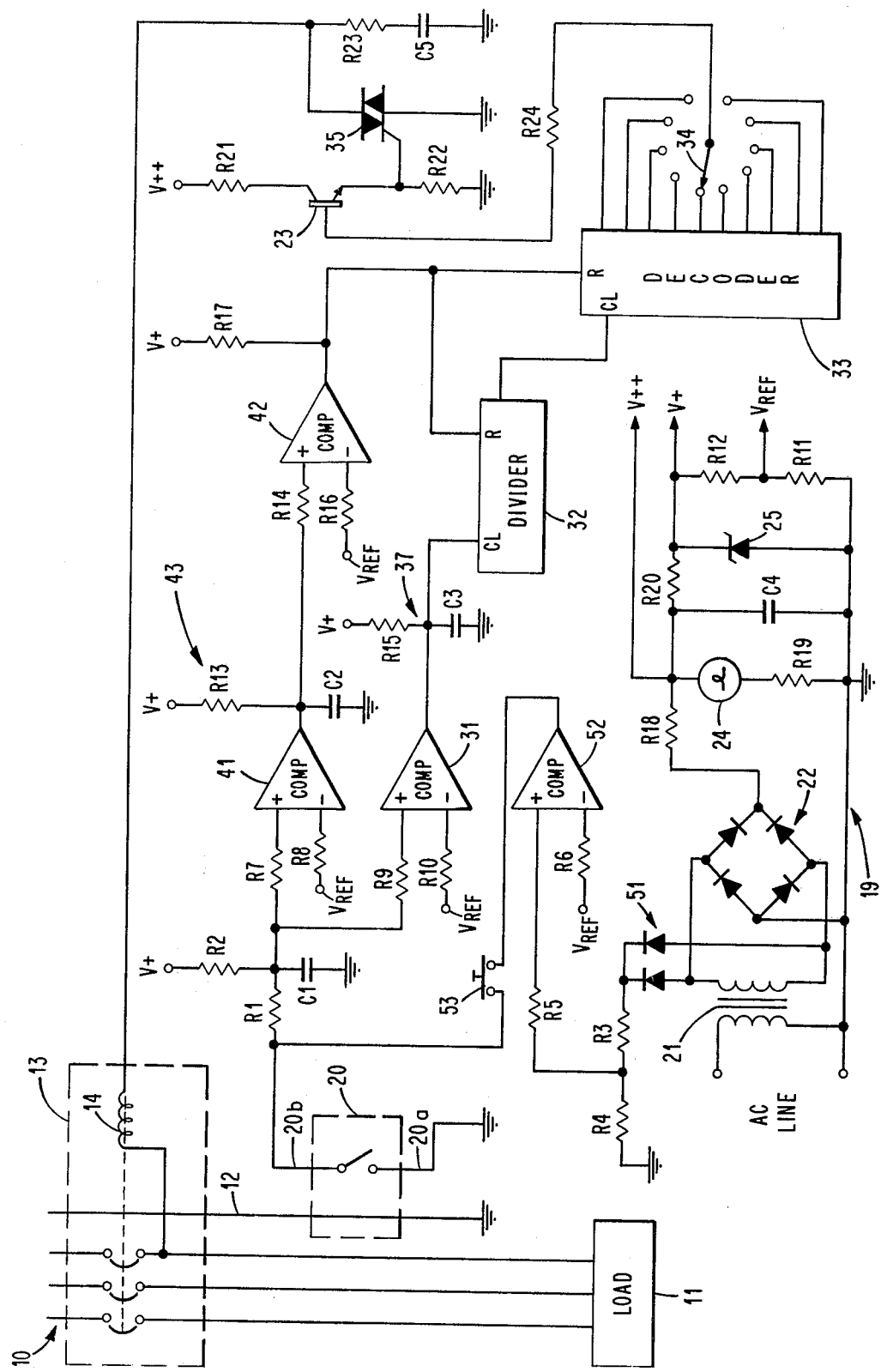

CURRENT MONITORING APPARATUS

BACKGROUND OF THE INVENTION

This invention relates to apparatus for monitoring current flow in a power supply line. More particularly, it is concerned with apparatus for monitoring the flow of current in the ground conductor of a polyphase AC electrical power system.

It is a common practice to monitor current flow in the ground conductor of a three-phase electrical system and to trip circuit breakers protecting the load connected to the system when the current flow exceeds certain predetermined limits. It is often desirable to introduce a delay in order to avoid nuisance tripping due to transient conditions. The delay period may be variable to permit adjustments for particular situations.

One form of apparatus for monitoring the current in a ground conductor employs a fault current sensor which includes a normally open magnetic reed switch. The magnetic flux produced by a fault current in the conductor causes the switch to close and open at twice the frequency of the current. While the switch is closed, the capacitance in a resistance-capacitance circuit is charged by a constant current source. The capacitance is connected to a switching transistor, and when the voltage across the capacitance is sufficient, the transistor turns on causing circuit breaker apparatus coupled thereto to trip. The time required to charge the capacitance may be varied by changing the value of the resistance, thereby varying the delay period.

With the foregoing apparatus it is difficult to obtain an accurately controlled delay period. There is a problem in matching the values of the resistance, the capacitance, and the source of constant current. In addition, individual component values may vary over the operating temperature range encountered. Since the portions of a cycle during which the contacts of the reed switch are closed (the duty factor) depends upon the magnitude of the fault current and because of contact bouncing, the length of time the contacts close varies. Calibration of the delay period is thus a serious problem. Testing and calibration in the field are particularly difficult.

SUMMARY OF THE INVENTION

Improved current monitoring apparatus in accordance with the present invention for monitoring current flow in a power supply line includes current sensing means coupled to the power supply line. The current sensing means has a pair of terminals and a switch which is connected between the terminals. The current sensing means alternately closes and opens the switch between the terminals at a predetermined frequency while the electrical current flowing in the power supply line exceeds a predetermined level. A pulse producing means is coupled to the terminals of the current sensing means for producing switching pulses at the same predetermined frequency in response to the closing and opening of the switch at that frequency. A counting means is coupled to the pulse producing means for counting switching pulses therefrom and produces an output signal at an output terminal in response to counting a selected predetermined number of switching pulses from the pulse producing means.

BRIEF DESCRIPTION OF THE DRAWING

The single FIGURE of the drawing is a schematic circuit diagram of current monitoring apparatus in accordance with the present invention employed with circuit breaker apparatus to provide protection for a load in a three-phase power system.

For a better understanding of the present invention, together with other and further objects, advantages, and capabilities thereof, reference is made to the following discussion and appended claims in connection with the above-described drawing.

DETAILED DESCRIPTION OF THE INVENTION

The FIGURE is a schematic circuit diagram illustrating apparatus in accordance with the present invention employed in conjunction with a three phase AC electrical power system 10 connected to a load 11. The system also includes a ground or neutral conductor 12 which is connected to ground. The load 11 is protected by a suitable circuit breaker apparatus as indicated at 13 which, as shown, includes a shunt trip coil 14.

A current sensor 20 is coupled to the ground conductor 12. The current sensor 20 includes a magnetic reed switch having normally open contacts which close when the switch is subjected to sufficiently high magnetic flux. The amount of magnetic flux produced depends on the current in the conductor 12. By varying the orientation of the reed switch with respect to the ground conductor 12 the portion of the magnetic flux to which it is subjected is varied. Thus, the current level required to close the switch can be varied by varying the orientation of the switch. Since the switch closes each time the instantaneous magnetic flux exceeds a predetermined level, the switch closes and opens at a frequency which is twice the frequency of the line current. Thus, for a 60 Hz current the switch closes and opens at a frequency of 120 Hz.

The apparatus as shown includes a power supply section 19 for providing operating voltages to the various components. The primary winding of a transformer 21 is connected to an AC power line, specifically to a 120 volts 60 Hz line. The secondary winding of the transformer is connected to a full-wave rectifier bridge 22 of four diodes. The output of the full-wave rectifier bridge 22 is connected through a current limiting resistance R18 to provide voltage source V++. An indicator lamp 24 and a current limiting resistance R19 are connected between the voltage source V++ and ground. An L-section filter of a capacitance C4 and a resistance R20 is shunted with a zener diode 25 to provide a regulated voltage source V+. A reference voltage $V_{REF}$ is taken from the voltage divider of resistances R12 and R11.

The switch of the current sensor 20 is connected between two terminals 20a and 20b. One terminal 20a is connected directly to ground and the other terminal 20b is connected to voltage source V+ through resistances R1 and R2. The juncture of resistances R1 and R2 is connected to ground through a capacitance C1 which serves to minimize and absorb spurious transient spikes.

The juncture of resistances R1 and R2 is connected through a resistance R9 to the + input of a comparator 31. The − input of the comparator 31 is connected to the $V_{REF}$ source through a resistance R10. The output of the comparator 31 is connected to an integrator 37 which includes the voltage source V+ connected through a resistance R15 to the output and a capacitance C3 connected between the output and ground. The integrator 37 has a time constant of about 1 to 2 milliseconds and serves to eliminate the effects of contact bounce upon closing of the switch in the sensor 20. The output of the comparator 31 is relatively high when the switch in the sensor 20 is open, and is relatively low when the switch is closed. The integrator 37 insures that when the switch in the sensor 20 alternately closes and opens because of excessive fault current, a series of negative-going pulses at a frequency of 120 Hz is produced at the output.

The output of the comparator 31 is applied as the clock input to a divider 32. The divider 32 may be formed by appropriately interconnecting counting circuits to provide, for example, a divide-by-12 arrangement which produces one output pulse for every 12 input pulses received. Thus, an output pulse is produced every 0.1 second in response to input pulses at a frequency of 120 Hz. The output of the divider 32 is applied to the clock input of a decoder 33. The decoder 33 has several output connections and an output signal is produced at each output connection in turn as determined by the number of pulses received from the divider 32. That is, the input signal from the decoder 33 steps from one output connection to the next one in turn in response to each input pulse. Thus, with ten output connections the output signal steps at 0.1 second intervals covering a range from 0.1 to 1.0 seconds. The divider 32 and decoder 33 each have reset connections, and each is reset to an initial state by a relatively high voltage applied thereto.

As illustrated schematically in the FIGURE, any one of the output connections of the decoder 33 may be selected by the setting of a selector switch 34. The output terminal of the switch 34 is coupled to the base of an NPN output transistor 23 by way of a resistance R24. The collector of the transistor is connected to the voltage source V++ through a resistance R21 and the emitter is connected through a resistance R22 to ground. The emitter of the transistor 23 is connected to the gate of a triac 35. The triac 35 is connected in a series circuit with the shunt trip coil 14 of the circuit breaker apparatus 13. When an output signal occurs at the selected output connection of the decoder 33, the output transistor 23 conducts firing the triac 35. The resulting current flow through the shunt trip coil 14 trips the circuit breaker apparatus 13 disconnecting the load from the electrical power system 10.

The apparatus also includes inhibiting circuitry of a comparator 41 having its + input connected through a resistance R7 to the juncture of resistances R1 and R2 and its − input connected to the $V_{REF}$ source through a resistance R8. The output of the comparator 41 is connected to an integrator 43 of a resistance R13 connected to the voltage source V+ and a capacitance C2 connected to ground. The integrator 43 has a time constant of approximately 23 milliseconds during which the output of the comparator 41 remains low after a relatively low input voltage is terminated by the opening of the switch of the sensor 20. Thus, so long as the sensor switch closes and opens continuously at the 120 Hz frequency, the voltage level at the output of the comparator 41 remains low. The output of the comparator 41 is applied through a resistance R14 to the + input of another comparator 42. The − input of the comparator 42 is connected through a resistance R16 to the reference voltage $V_{REF}$. The output of the comparator 42 is connected to the V+ voltage source through a resistance R17 and to the reset connections of the divider 32 and the decoder 33. The output of the comparator 42 is low when the output of the comparator 41 is low, that is when the switch of the sensor 20 is closed. When the switch of the sensor 20 is open for a period longer than the time constant of the integrator 43, the output of the comparator 42 is relatively high producing a reset signal at the reset connections of the divider 32 and the decoder 33. The reset signal resets the divider 32 and the decoder 33 to their initial states. They remain in their initial states prevented from responding to pulses at their clock inputs until the reset signal terminates.

Thus, when current flow in the ground conductor 12 is such that the instantaneous current produces a magnetic field sufficient to cause the switch in the sensor 20 to close, the switch closes and opens at a frequency of 120 Hz. Pulse producing circuitry coupled to the switch including the integrator 37 produces pulses at the clock input of the divide-by-12 divider 32. The inhibiting circuitry including the integrator 43 also responds to the closing and opening of the switch in the sensor 20 at the 120 HZ frequency to prevent a reset signal from being applied at the reset connections of the divider 32 and the decoder 33. The divider 32 applies output pulses to the decoder 33 at a frequency of 12 Hz. The decoder 33 responds to the received pulses to produce an output signal at each of its output terminals in turn. Thus, depending upon which of the ten output connections of the decoder 33 is selected by the setting of the selector switch 34, the delay period for an output signal to be produced at the output terminal of the switch 34 may be from 0.1 to 1.0 second subsequent to the first closing of the switch of the sensor 20. The output signal turns on the transistor 23 which in turn fires the triac 35 drawings current through the shunt trip coil 14 to trip the circuit breaker apparatus 13. If the switch does not continue to close and open near the 120 Hz frequency for the delay period, the inhibiting circuitry produces a reset signal resetting the divider 32 and the decoder 33 to their initial states.

The apparatus as shown also includes very simple testing circuitry for determining whether or not the apparatus is producing output signals with the correct delay periods. The test circuitry includes a full-wave rectifier bridge 51 of two diodes across the secondary winding of the transformer 21. The rectifier bridge is connected to ground through a voltage divider of resistances R3 and R4. The voltage divider is connected through a resistance R5 to the + input of a comparator 52. The − input of the comparator 52 is connected through a resistance R6 to the $V_{REF}$ voltage source. The output of the comparator 52 is connected through a normally open pushbutton switch 53 to the terminal 20b of the switch of the sensor 20. The diode bridge 51 provides a 120 Hz pulse source to the comparator 52 which, therefore, produces output pulses at a frequency of 120 Hz. By closing the pushbutton switch 53 these pulses are applied to the comparators 31 and 41 simulating the closing and opening of the switch of the sensor 20. Thus, an operational check of the apparatus may be performed and the time delays at the output connections of the decoder 33 may be checked.

In one specific embodiment of the apparatus as described the V++ voltage was 17 volts, the V+ voltage was 12 volts, and the $V_{REF}$ voltage was 6 volts. The comparators 31, 41, 42, and 52 were LM3302 comparators. The divider 32 employed interconnected CD4404 and CD4018 counters to form a divide-by-12 divider. The decoder was a CD4017 decoder. The NPN transistor 23 was a type MM3005, and the triac 35 was a type RCA40669.

Current monitoring apparatus as shown and described employs digital techniques rather than analog, with the timing information provided by the frequency of the current being monitored. Therefore problems of component matching, temperature compensation, tolerance errors, and switch duty factor are avoided. An accurate delay period is obtained and the delay period is easily changed. Circuit adjustments and lengthy calibration procedures are not required and testing in the field is extremely simple.

While there has been shown and described what is considered a preferred embodiment of the present invention, it will be obvious to those skilled in the art that various changes and modifications may be made therein with departing from the invention as defined by the appended claims.

What is claimed is:

1. Current monitoring apparatus for monitoring current flow in a power supply line comprising
    current sensing means operable to be coupled to a power supply line, said current sensing means having a pair of terminals and a switch connected therebetween and being operable to alternately close and open the switch between the terminals at a predetermined frequency while the electrical current flowing in the power supply line exceeds a predetermined level;
    pulse producing means coupled to the terminals of said current sensing means for producing switching pulses at said predetermined frequency in response to the closing and opening of said switch at said predetermined frequency; and
    counting means coupled to said pulse producing means for counting switching pulses therefrom and being operable to produce an output signal at an output terminal in response to counting a selected predetermined number of switching pulses from said pulse producing means.

2. Current monitoring apparatus in accordance with claim 1 wherein
    said counting means includes means for selectively varying said selected predetermined number of switching pulses to be counted in order for the counting means to produce an output signal at the output terminal.

3. Current monitoring apparatus in accordance with claim 1 wherein
    electrical current flowing in the power supply line is alternating current; and
    said switch of said current sensing means closes when the magnetic flux produced by instantaneous current flow in the power supply line exceeds a predetermined level whereby said switch alternately closes and opens at a predetermined frequency which is twice the frequency of the alternating current and said pulse producing means produces switching pulses at a frequency twice the frequency of the alternating current.

4. Current monitoring apparatus in accordance with claim 3 wherein
    said current sensing means comprises a magnetic reed switch.

5. Current monitoring apparatus in accordance with claim 3 including
    inhibiting means coupled to said current sensing means and to said counting means for preventing said counting means from counting switching pulses from said pulse producing means unless said switch closes and opens continuously at a frequency greater than a second predetermined frequency which is less than said first-mentioned predetermined frequency.

6. Current monitoring apparatus in accordance with claim 5 wherein said counting means includes
    dividing means coupled to said pulse producing means for repeatedly counting through a recurring sequence of switching pulses and producing a signal pulse upon completion of each sequence;
    decoding means having a plurality of output connections and being coupled to said dividing means for receiving signal pulses therefrom, said decoding means being operable to produce an output signal at each of said output connections in turn as determined by the number of signal pulses received from said dividing means; and
    selection means for connecting a selected one of said plurality of output connections of the decoding means to the output terminal to produce said output signal thereon.

7. Current monitoring apparatus in accordance with claim 6 wherein
    said dividing means counts through each sequence of switching pulses from an initial state and is operable to be reset to said initial state by a reset signal at a reset connection;
    said decoding means is operable to be reset to an initial state during which no output signal is produced at any of said output connections by a reset signal at a reset connection; and
    said inhibiting means is coupled to said reset connections of said dividing means and said decoding means and is operable to produce a reset signal thereat except when said switch of said current sensing means closes and opens continuously at said frequency greater than said second predetermined frequency which is less than said first-mentioned predetermined frequency.

8. Current monitoring apparatus in accordance with claim 7 wherein
    one of said pair of terminals of said current sensing means is connected to a point of reference potential;
    and said pulse producing means includes
    first comparator means having one input coupled to the other of said pair of terminals of said current sensing means and an output coupled to said dividing means;
    voltage source means coupled to said other of said pair of terminals of said current sensing means and to said one input of the first comparator means, said voltage source means being operable to produce a first voltage level at said one input when the switch of the current sensing means is open and being operable to produce a second voltage level at said one input when the switch is closed;
    said first comparator means being operable to produce a first output voltage at its output when said first voltage level is present at said one input and being operable to produce a second output voltage at its output when said second voltage level is present at said one input; and
    first integrating means coupled to the output of said first comparator means for maintaining said second output voltage at said output for a predetermined period subsequent to termination of the second voltage level at said one input to eliminate the effects of momentary reopening and reclosing of said switch upon closing.

9. Current monitoring apparatus in accordance with claim 8 wherein said inhibiting means includes second comparator means having one input coupled to said other of said pair of terminals of said current sensing means and to said voltage source means and having an output;

said voltage source means being operable to produce a first voltage level at said one input when the switch of the current sensing means is open and being operable to produce a second voltage level at said one input when the switch is closed;

said second comparator means being operable to produce a first output voltage at its output when said first voltage level is present at said one input and being operable to produce a second output voltage at its output when said second voltage level is present at said one input;

third comparator means having one input coupled to the output of the second comparator means and an output connected to the reset connections of said dividing means and said decoding means and being operable to produce a reset signal at said reset connections when said second output voltage is present at said one input; and second integrating means coupled to the output of the second comparator means and to said one input of the third comparator means for maintaining said second output voltage at said one input terminal of the third comparator means for a predetermined period subsequent to termination of the second voltage level at said one input of the second comparator means, said predetermined period being greater than the period between successive closings of the switch of said current sensing means when the current flowing in the power supply line exceeds said predetermined level.

10. Current monitoring apparatus in accordance with claim 9 including output means coupled to said output terminal for producing an actuating signal to trip circuit breaker apparatus in response to an output signal at said output terminal.

11. Current monitoring apparatus in accordance with claim 10 including testing means comprising a source of test pulses of frequency equal to the frequency of closing and opening of the switch of said current sensing means; and switch means for connecting said source of test pulses to said other terminal of the pair of terminals of said current sensing means whereby test pulses simulating the closing and opening of the switch of said current sensing means are applied to the pulse producing means and to the inhibiting means.

12. Ground monitoring apparatus for monitoring the ground conductor of a polyphase AC electrical power system and for tripping circuit breaker apparatus in the power system when the current through the ground conductor exceeds a predetermined level, said apparatus comprising current sensing means magnetically coupled to the ground conductor; said current sensing means having a pair of terminals and a switch connected therebetween and being operable to alternately close and open the switch between the terminals at a predetermined frequency which is twice the AC frequency while the electrical current flowing in the ground conductor exceeds a predetermined level;

pulse producing means coupled to the terminals of said current sensing means for producing switching pulses at said predetermined frequency in response to the closing and opening of said switch at said predetermined frequency;

counting means coupled to said pulse producing means for counting switching pulses therefrom and being operable to produce an output signal at an output terminal in response to counting a selected predetermined number of switching pulses from said pulse producing means; and output means coupled to said output terminal and to the circuit breaker apparatus in the power system for producing an actuating signal to trip the circuit breaker apparatus in response to an output signal at said output terminal.

13. Current monitoring apparatus in accordance with claim 12 wherein said current sensing means comprises a magnetic reed switch.

14. Current monitoring apparatus in accordance with claim 12 including inhibiting means coupled to said current sensing means and to said counting means for preventing said counting means from counting switching pulses from said pulse producing means unless said switch closes and opens continuously at a frequency greater than a second predetermined frequency which is less than said first-mentioned predetermined frequency.

15. Current monitoring apparatus in accordance with claim 14 wherein said counting means includes dividing means coupled to said pulse producing means for repeatedly counting through a recurring sequence of switching pulses and producing a signal pulse upon completion of each sequence;

decoding means having a plurality of output connections and being coupled to said dividing means for receiving signal pulses therefrom, said decoding means being operable to produce an output signal at each of said output connections in turn as determined by the number of signal pulses received from said dividing means; and selection means for connecting a selected one of said plurality of output connections of the decoding means to the output terminal to produce said output signal thereon.

16. Current monitoring apparatus in accordance with claim 15 wherein said dividing means counts through each sequence of switching pulses from an initial state and is operable to be reset to said initial state by a reset signal at a reset connection;

said decoding means is operable to be reset to an initial state during which no output signal is produced at any of said output connections by a reset signal at a reset connection; and said inhibiting means is coupled to said reset connections of said dividing means and said decoding means and is operable to produce a reset signal thereat except when said switch of said current sensing means closes and opens continuously at said frequency greater than said second predetermined frequency which is less than said first-mentioned predetermined frequency.

17. Current monitoring apparatus in accordance with claim 16 wherein
one of said pair of terminals of said current sensing means is connected to a point of reference potential;
and said pulse producing means includes
first comparator means having one input coupled to the other of said pair of terminals of said current sensing means and an output coupled to said dividing means;
voltage source means coupled to said other of said pair of terminals of said current sensing means and to said one input of the first comparator means, said voltage source means being operable to produce a first voltage level at said one input when the switch of the current sensing means is open and being operable to produce a second voltage level at said one input when the switch is closed;
said first comparator means being operable to produce a first output voltage at its output when said first voltage level is present at said one input and being operable to produce a second output voltage at its output when said second voltage level is present at said one input; and
first integrating means coupled to the output of said first comparator means for maintaining said second output voltage at said output for a predetermined period subsequent to termination of the second voltage level at said one input to eliminate the effects of momentary reopening of said switch upon closing.

18. Current monitoring apparatus in accordance with claim 17 wherein said inhibiting means includes
second comparator means having one input coupled to said other of said pair of terminals of said current sensing means and to said voltage source means and having an output;
said voltage source means being operable to produce a first voltage level at said one input when the switch of the current sensing means is open and being operable to produce a second voltage level at said one input when the switch is closed;
said second comparator means being operable to produce a first output voltage at its output when said first voltage level is present at said one input and being operable to produce a second output voltage at its output when said second voltage level is present at said one input;
third comparator means having one input coupled to the output of the second comparator means and an output connected to the reset connections of said dividing means and said decoding means and being operable to produce a reset signal at said reset connections when said second output voltage is present at said one input; and
second integrating means coupled to the output of the second comparator means and to said one input of the third comparator means for maintaining said second output voltage at said one input of the third comparator means for a predetermined period subsequent to termination of the second voltage level at said one input of the second comparator means, said predetermined period being greater than the period between successive closings of the switch of said current sensing means when the current flowing in the power supply line exceeds said predetermined level.

* * * * *